(12) United States Patent
Benhase et al.

(10) Patent No.: US 8,639,877 B2
(45) Date of Patent: Jan. 28, 2014

(54) WEAR LEVELING OF SOLID STATE DISKS DISTRIBUTED IN A PLURALITY OF REDUNDANT ARRAY OF INDEPENDENT DISK RANKS

(75) Inventors: Michael Thomas Benhase, Tucson, AZ (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 12/495,244

(22) Filed: Jun. 30, 2009

(65) Prior Publication Data

US 2010/0332749 A1    Dec. 30, 2010

(51) Int. Cl.
G06F 12/00    (2006.01)
G06F 13/00    (2006.01)
G06F 13/28    (2006.01)

(52) U.S. Cl.
USPC ......................................................... 711/114

(58) Field of Classification Search
USPC ......................................................... 711/114
See application file for complete search history.

(56) References Cited

U.S. PATENT DOCUMENTS

| | | |
|---|---|---|
| 5,341,339 A | 8/1994 | Wells |
| 5,490,248 A | 2/1996 | Dan et al. |
| 5,671,388 A | 9/1997 | Hasbun |
| 5,754,756 A | 5/1998 | Watanabe et al. |
| 5,799,140 A | 8/1998 | Niijima et al. |
| 5,822,782 A | 10/1998 | Humlicek et al. |
| 5,875,459 A | 2/1999 | Taoda |
| 7,073,010 B2 | 7/2006 | Chen et al. |
| 7,120,729 B2 | 10/2006 | Gonzalez et al. |
| 7,191,207 B2 * | 3/2007 | Blount et al. ................. 709/200 |
| 7,328,305 B2 | 2/2008 | Kleiman et al. |
| 7,409,490 B2 | 8/2008 | Liu |
| 7,409,492 B2 | 8/2008 | Tanaka et al. |

(Continued)

FOREIGN PATENT DOCUMENTS

| | | |
|---|---|---|
| EP | 1628218 | 2/2006 |
| EP | 1840722 | 3/2007 |

(Continued)

OTHER PUBLICATIONS

Scott Lowe, Non-standard RAID levels primer: RAID 5E and 5EE,Techrepublic, May 29, 2007.*

(Continued)

*Primary Examiner* — Matthew Bradley
*Assistant Examiner* — Craig Goldschmidt
(74) *Attorney, Agent, or Firm* — Rabindranath Dutta; Konrad, Raynes, Davda and Victor LLP (57) ABSTRACT

A computational device allocates a plurality of solid state disks to a plurality of redundant array of independent disk (RAID) ranks, wherein a different solid state disk is absent in each RAID rank of the plurality of RAID ranks. The computational device determines at least one selected solid state disk from the plurality of solid state disks, wherein the at least one selected solid state disk is estimated to have undergone a greater amount of wear in comparison to other solid state disks in the plurality of solid state disks. Relatively more data and parity information is written to those RAID ranks in which the at least one selected solid state disk is absent in comparison to those RAID ranks in which the at least one selected solid state disk is present.

17 Claims, 8 Drawing Sheets

(56) References Cited

U.S. PATENT DOCUMENTS

| | | | |
|---|---|---|---|
| 7,437,508 | B2 | 10/2008 | Hajji |
| 7,441,067 | B2 | 10/2008 | Gorobets et al. |
| 7,444,360 | B2 | 10/2008 | Frondozo et al. |
| 8,006,166 | B2 | 8/2011 | Roohparvar et al. |
| 8,015,353 | B2 | 9/2011 | Kabir et al. |
| 8,015,371 | B2 | 9/2011 | Araki et al. |
| 2002/0099908 | A1 | 7/2002 | Yamamoto et al. |
| 2004/0186899 | A1 | 9/2004 | Hiraiwa et al. |
| 2006/0047896 | A1 | 3/2006 | Nguyen et al. |
| 2007/0204128 | A1 | 8/2007 | Lee et al. |
| 2007/0233931 | A1 | 10/2007 | Tanaka et al. |
| 2007/0239927 | A1 | 10/2007 | Rogers et al. |
| 2008/0059698 | A1 | 3/2008 | Kabir et al. |
| 2008/0091872 | A1 | 4/2008 | Bennett et al. |
| 2008/0098158 | A1 | 4/2008 | Kitahara |
| 2008/0104444 | A1 | 5/2008 | Kojima et al. |
| 2008/0126680 | A1 | 5/2008 | Lee et al. |
| 2008/0140918 | A1 | 6/2008 | Sutardja |
| 2008/0155160 | A1 | 6/2008 | McDaniel |
| 2008/0158958 | A1 | 7/2008 | Sokolov et al. |
| 2008/0183947 | A1 | 7/2008 | Shone et al. |
| 2008/0201392 | A1 | 8/2008 | Nakajima et al. |
| 2008/0215800 | A1 | 9/2008 | Lee et al. |
| 2008/0276038 | A1 | 11/2008 | Tanaka et al. |
| 2009/0125671 | A1 | 5/2009 | Flynn et al. |
| 2009/0172335 | A1 | 7/2009 | Kulkarni et al. |
| 2009/0319743 | A1 | 12/2009 | Ash et al. |
| 2010/0005228 | A1 | 1/2010 | Fukutomi et al. |
| 2010/0115183 | A1 | 5/2010 | Araki et al. |
| 2010/0125695 | A1 | 5/2010 | Wu et al. |
| 2010/0205359 | A1 | 8/2010 | Tanaka et al. |
| 2010/0218070 | A1 | 8/2010 | Franceschini et al. |
| 2011/0066882 | A1 | 3/2011 | Walls et al. |

FOREIGN PATENT DOCUMENTS

| | | |
|---|---|---|
| WO | 9926150 | 5/1999 |
| WO | 2007112555 | 10/2007 |
| WO | 9917204 | 2/2011 |

OTHER PUBLICATIONS

U.S. Appl. No. 12/561,210, filed Sep. 16, 2009, entitled, "Wear Leveling of Solid State Disks Based on Usage Information of Data and Parity Received From a Raid Controller", invented by Andrew Dale Walls.

International Search Report for International Application No. PCT/EP2010/062509, filed Aug. 26, 2010, dated Nov. 5, 2010, 11pgs.

Lee. S. et al., "Advances in Flash Memory SSD Technology for Enterprise Database Applications", SIGMOD' 09, Jun. 29-Jul. 2, 2009, 8 pgs, Providence, Rhode Island, U.S.A.

Nitin A, et al. "Design Tradeoffs for SSD Performance", was scheduled to appear in the Proceedings of the USENIX Technical Conference, Jun. 2008, http://research.microsoft.com/users/vijayanp/papers/ssd-usenix08.pdf.

Myers D., "On the Use of NAND Flash Memory in High-Performance Relational Databases", Master's Thesis, MIT, pp. 1-49, Febuary 2008, http://people.csail.mit.edu/dsm/flash-thesis.pdf.

Narayanan D. et al. "Migrating Enterprise Storage to SSDs: Analysis of Tradeoffs", Microsoft Research Ltd., Technical Report MSR-TR-2008-169, pp. 1-12, Nov. 2008, ftp://ftp.research.microsoft.com/pub/tr/TR-2008-169.pdf.

Gray J. et al, "Flash Disk Opportunity for Server Applications", ACM Queue, pp. 18-23, Jul./Aug. 2008.

Dinkelman, T., "SSDs A Shift in Data Storage", Micron Technology, Inc., Aug. 2008, pp. 1-26.

Pariseau, B., "Are Solid-State Disks Ready for the Enterprise?", [online], [Retrieved Mar. 11, 2009], retrieved from the internet at <URL http://searchStorage.techtarget.com/magazineFeature/0,296894,sid5_gci1334535,00html, 2 pp.

Chang, L., "Hybrid Solid State Disks:Combining Hetergeneouos NAND Flash in Large SSDs" ASPDAC 2008, [online] retrieved from the internet at URL <http://www.aspdac.com/aspdac2008/Archive_Folder/5B_Slides/5B-1.pdf, 26 pp.

"Silicon Motion's Hybrid SLC/MLC SSD Controller", Yahoo! Message Boards, posted on Jun. 24, 2008, retrieved from the internet at <URL http://messages.finance.yahoo/stocks_(A to Z) / Stocks_S/threadview? m=tm&bn=22578&tid=10968&mid=10968&tof=18&off=1, 3 pp.

Schmid, P., "Apacer Mixes Fast SLC with MLC Flash on a Single Drive", Tom's Hardware, Jun. 4 , 2008, retrieved from the Internet at URL< http://www.tomshardware.com/news/FlashSSD-SLC-MLC.5571.html, 2 pp.

USPTO for U.S. Appl. No. 13/523,756, filed Jun. 14, 2012, entitled "Wear Leveling of Solid State Disks Based on Usage Information of Data and Parity Received From a Raid Controller" invented by Michael Benhase et al. pp. 1-32.

Office Action dated Mar. 28, 2011, pp. 1-18, for U.S. Appl. No. 12/561,210, filed Sep. 16, 2009 by inventors Andrew Dale Walls et al.

Response to Office Action dated Aug. 29, 2011, pp. 1-13, for U.S. Appl. No. 12/561,210, filed Sep. 16, 2009 by inventors Andrew Dale Walls et al.

Final Office Action dated Nov. 23, 2011, pp. 1-10, for U.S. Appl. No. 12/561,210, filed Sep. 16, 2009 by inventors Andrew Dale Walls et al.

Response to Final Office Action dated Feb. 23, 2012, pp. 1-8, for U.S. Appl. No. 12/561,210, filed Sep. 16, 2009 by inventors Andrew Dale Walls et al.

Notice of Allowance dated Mar. 21, 2012, pp. 1-12, for U.S. Appl. No. 12/561,210, filed Sep. 16, 2009 by inventors Andrew Dale Walls et al.

* cited by examiner

WEAR LEVELING OF SOLID STATE DISKS DISTRIBUTED IN A PLURALITY OF REDUNDANT ARRAY OF INDEPENDENT DISK RANKS

BACKGROUND

1. Field

The disclosure relates to a method, a system, and a computer program product for wear leveling of solid state disks distributed in a plurality of redundant array of independent disk ranks.

2. Background

A solid state disk (SSD) may comprise a data storage device that uses solid state memory to store persistent digital data. Solid state disks may include flash memory or memory of other types. Solid state disks may be accessed much faster in comparison to electromechanically accessed data storage devices, such as, hard disks.

Redundant Array of Independent Disks (RAID) is a computer data storage scheme. In certain types of RAID implementations data and parity information may be written in stripes across a plurality of disks. In such RAID schemes one or more disks may fail without loss of data. For example, in an exemplary RAID-6 array, data and parity may be distributed across at least four disks and a RAID array that implements the RAID-6 scheme can recover from the failure of as many as two disks. RAID arrays may be formed from hard disks, solid state disks or from other types of storage media.

SUMMARY OF THE PREFERRED EMBODIMENTS

Provided are a method, a system, and a computer program product, in which a computational device allocates a plurality of solid state disks to a plurality of redundant array of independent disk (RAID) ranks, wherein a different solid state disk is absent in each RAID rank of the plurality of RAID ranks. The computational device determines at least one selected solid state disk from the plurality of solid state disks, wherein the at least one selected solid state disk is estimated to have undergone a greater amount of wear in comparison to other solid state disks in the plurality of solid state disks. Relatively more data and parity information is written to those RAID ranks in which the at least one selected solid state disk is absent in comparison to those RAID ranks in which the at least one selected solid state disk is present.

In certain embodiments, the allocated solid state disks in each RAID rank are fewer in number than the plurality of solid state disks. Furthermore, each solid state disk of the plurality of solid state disks is shared by more than one RAID rank.

In further embodiments, distributed sparing is performed by preferentially allocating spare space on those solid state disks that are estimated to have undergone a greater amount of wear in comparison to other solid state disks in the plurality of solid state disks In additional embodiments, in response to the plurality of solid state disks being allocated in a log structured array, metadata is added to an index of the log structured array, wherein in log structured arrays each write is performed without any overwriting of previously performed writes. Furthermore, in response to the plurality of solid state disks being allocated as home area storage systems, RAID ranks are rotated based on stripe number.

In yet additional embodiments, the plurality of RAID ranks and the plurality of solid state disks are same in number, wherein each RAID rank has one less solid state disk than the plurality of solid state disks. A first indicator corresponding to each RAID rank is maintained, wherein the first indicator indicates the amount of data and parity to be written to a corresponding RAID rank. A second indicator corresponding to each solid state disk is maintained, wherein the second indicator indicates an amount of wear undergone by a corresponding solid state disk. A data structure that indicates an adjustment to be made to a value stored in the first indicator based on differences in second indicator values of the plurality of solid state disks is maintained.

In further embodiments, the at least one selected solid state disk is a first solid state disk. The computational device determines a second solid state disk from the plurality of solid state disks, wherein the second solid state disk is estimated to have a lesser amount of life left in comparison to other solid state disks in the plurality of solid state disks. Relatively more data and parity information is written to those RAID ranks in which the second selected solid state disk is absent in comparison to those RAID ranks in which the second solid state disk is present.

In further embodiments, the computational device is a RAID controller, and the plurality of solid state disks are operatively coupled to the RAID controller.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

If a RAID array is formed from hard disks, it may be desirable to distribute the data and parity information across all the hard disks that are included in the RAID array in order to improve system performance. In certain situations, the time taken by hard disks to wear out may not be a material factor in RAID arrays that are formed from hard disks. In such situations, the distribution of data and parity information across all of the hard disks that are included in the RAID array may not cause significant problems.

However, solid state disks may wear out relatively faster in comparison to hard disks, as a result of write endurance and read disturb problems associated with solid state disks. For example, certain exemplary solid state disks can only be put through a limited number of erase cycles before becoming unreliable. These properties of write endurance and read disturb problems may be exacerbated as the geometries of solid state disks get smaller. For example, in solid states disks implemented by using Multi-level cell (MLC) devices technologies these write endurance and read disturb problems may become relatively severe. Techniques exist for wear leveling and scrubbing and ways to maximize the endurance within a solid state disk.

Wear leveling attempts to work around these limitations by arranging data so that erasures and rewrites are distributed evenly across solid state disks. In this way, no single solid state disk prematurely fails because of a high concentration of write cycles. However, when a RAID array is formed from a plurality of solid state disks, the data and parity information may be distributed across all of the solid state disks of the RAID array, irrespective of the wear level of each solid state disk.

Certain embodiments provide a plurality of RAID ranks created from a plurality of solid state disks. Such embodiments provide an ability to increase solid state disk reliability by spreading the workload for reading and writing around the RAID ranks, such that the solid state disks wear relatively evenly. In certain embodiments, a plurality of RAID ranks are maintained, wherein each RAID rank is comprised of a plurality of solid state disks. For example, in certain embodiments that use N solid state disks, N RAID-6 ranks may be defined with each RAID-6 rank having a width of M, where M=N−1.

Exemplary Embodiments

Figure 1:
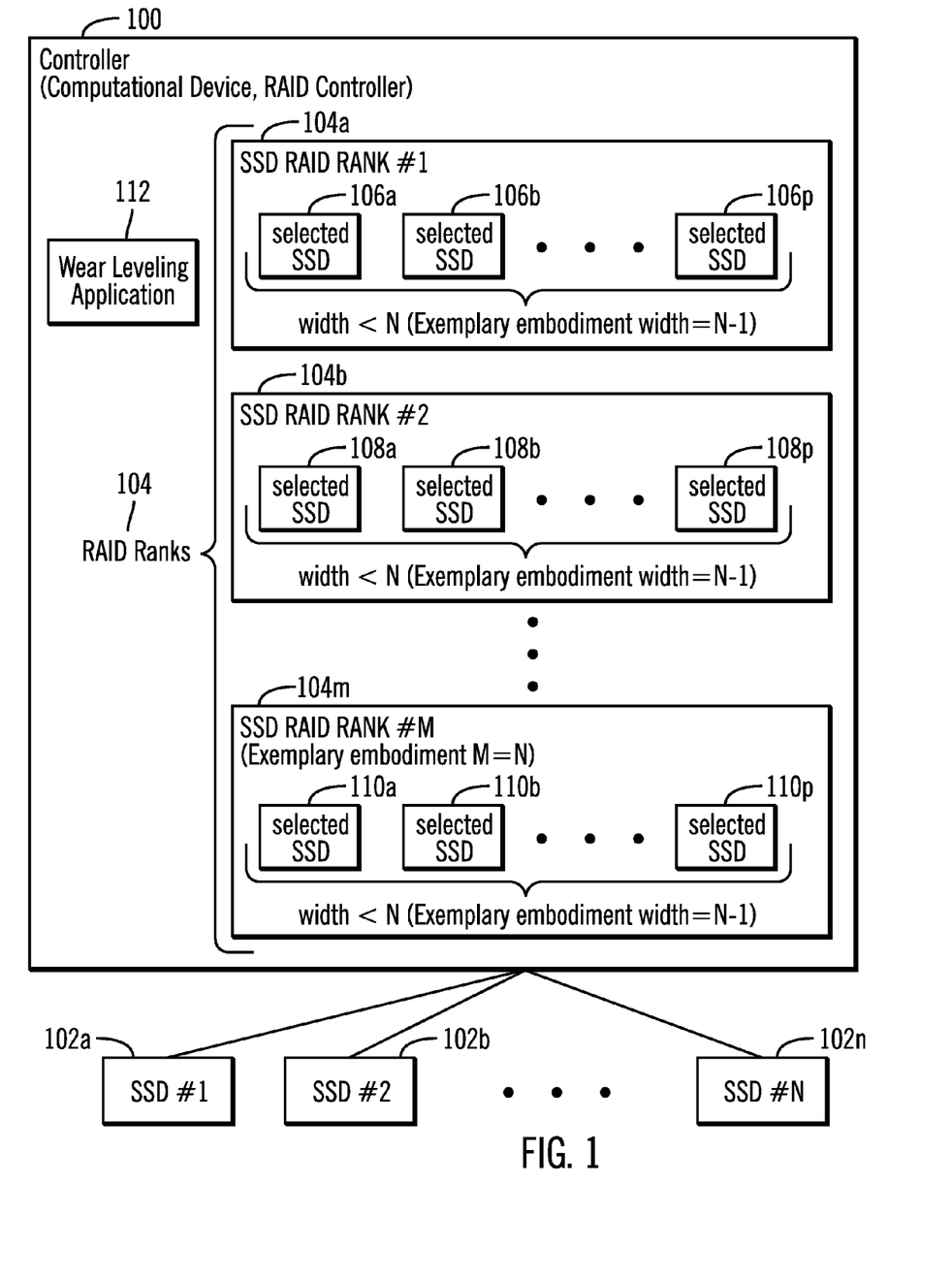
FIG. 1 illustrates a block diagram of an exemplary controller that controls a plurality of solid state disks, in accordance with certain embodiments.

FIG. 1 illustrates a block diagram of an exemplary controller 100 that controls a plurality of N solid state disks 102a, 102b, . . . , 102n, in accordance with certain embodiments. The exemplary controller 100 may comprise any suitable computational device, such as, a personal computer, a mainframe, a workstation, a server, a client, a telephony device, a laptop, a blade computer, etc. The exemplary controller 100 may be referred to as a RAID controller because the plurality of solid state disks 102a . . . 102n are allocated among a plurality of RAID ranks 104, and the controller 100 controls the operations of the RAID ranks 104.

In an illustrative embodiment shown in FIG. 1 the RAID ranks are M in number and are shown via reference numerals 104a, 104b, . . . 104m, wherein each RAID rank is allocated a plurality of solid state disks selected from the solid state disks 102a . . . 102n. In certain embodiments, the number of RAID ranks 104 is equal to the number of solid state disks 102a . . . 102n, i.e., M=N. In alternative embodiments, the number of RAID ranks may be fewer than the number of solid state disks 102a . . . 102n.

A wear leveling application 112 included in the controller 100 controls the writing of data and parity information to the plurality of RAID ranks 104a . . . 104m, such that wear leveling is performed on the solid state disks 102a . . . 102n that are included in the RAID ranks 104a . . . 104m.

In FIG. 1, exemplary RAID rank #1 104 is comprised of solid state disks 106a,106b . . . , 106p exemplary RAID rank #2 104b is comprised of solid state disks 108a,108b, . . . 108p, and exemplary RAID rank #M 104m is comprised of solid state disks 110a, 110b, . . . 110p, wherein the solid stated disks that are included in the RAID ranks 104a, 104b, . . . , 104m are selected from the solid stated disks 102a . . . 102n.

The number of solid state disks included in a RAID rank may be referred to as the width of the RAID rank. In certain embodiments, the width of each of the RAID ranks 104a . . . 104m is less than the number of solid state disks 102a . . . 102n. For example, in certain embodiments the width of each RAID rank 104a . . . 104m may be N−1 if N solid stated disks 102a . . . 102n are present.

In certain embodiments, each RAID rank 104a . . . 104m has a different solid state disk that is absent. Additionally, each of the solid state disks 102a . . . 102m are to be found in more than one RAID rank 104a . . . 104m.

Figure 2:
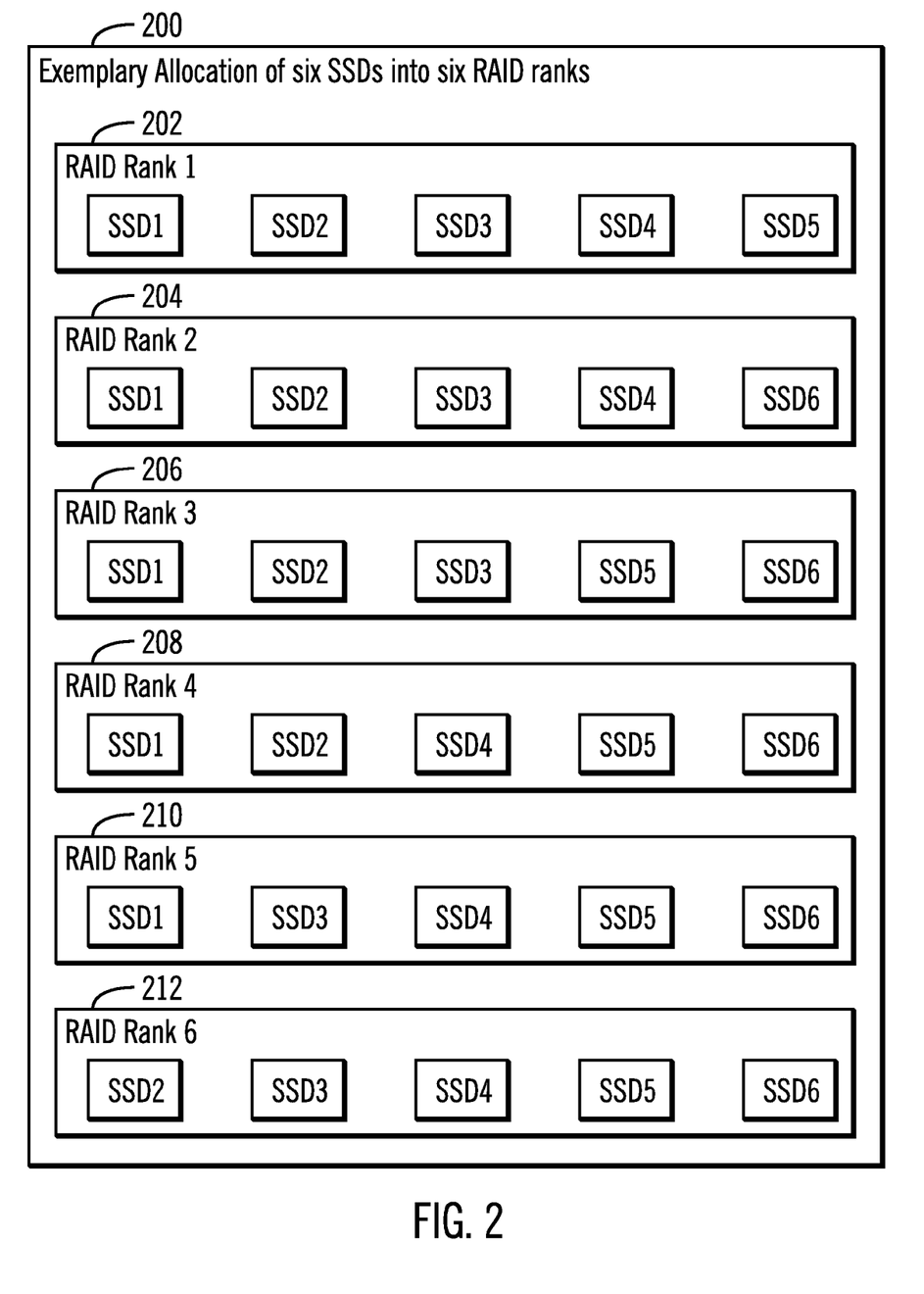
FIG. 2 illustrates a block diagram that shows an exemplary allocation of six solid state disks into six RAID ranks, in accordance with certain embodiments.

FIG. 2 illustrates a block diagram 200 that shows an exemplary allocation of six solid state disks into six RAID ranks, in accordance with certain embodiments. The six solid state disks are SSD1, SSD2, SSD3, SSD4, SSD5, SSD6. The number of RAID ranks are six and equals the number of solid state disks. The six RAID ranks are shown via reference numerals 202, 204, 206, 208, 210, 212. It can be seen that each of the RAID ranks has five of the six solid state disks. For example, RAID rank 202 is comprised of the solid state disks SSD1, SSD2, SSD3, SSD4, SSD5 but is missing SSD6. RAID rank 204 comprises all of the solid state disks except for SSD5, RAID rank 206 comprises all of the solid state disks except for SSD4, RAID rank 208 comprises all of the solid state disks except for SSD3, RAID rank 210 comprises all of the solid state disks except for SSD2, RAID rank 212 comprises all of the solid state disks except for SSD1.

Figure 3:
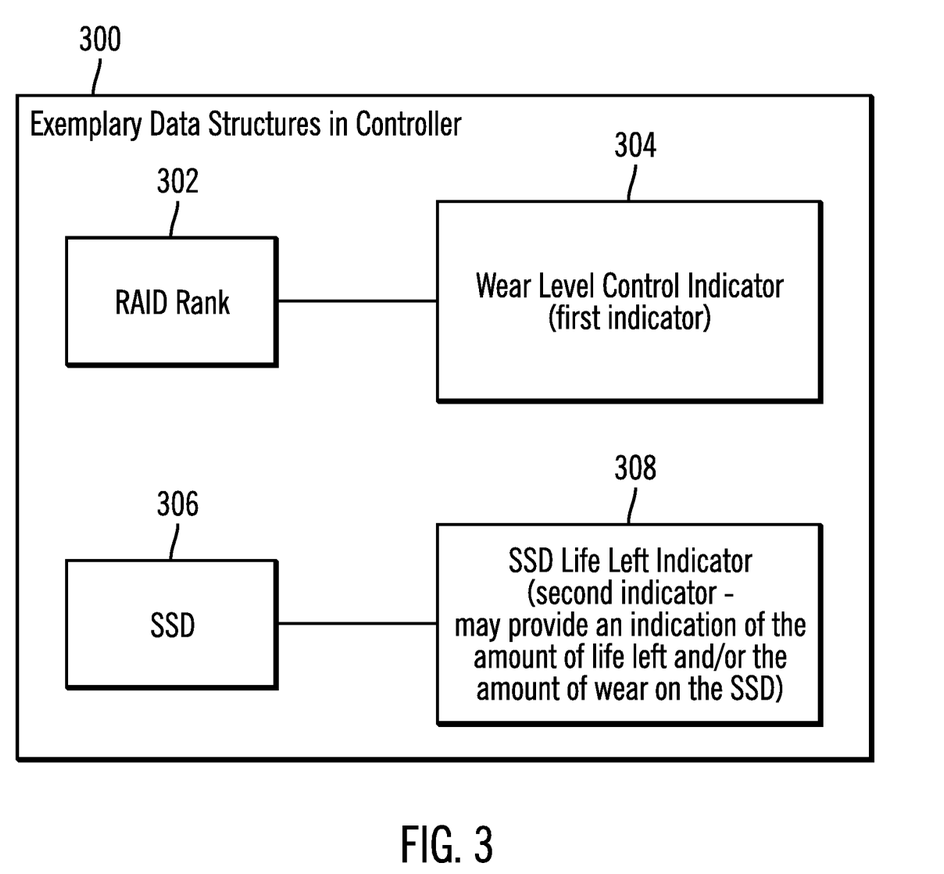
FIG. 3 illustrates a block diagram that shows first exemplary data structures associated with RAID ranks and solid state disks in the controller, in accordance with certain embodiments.

FIG. 3 illustrates a block diagram that shows first exemplary data structures 300 associated with RAID ranks and solid state disks in the controller 100, in accordance with certain embodiments.

In an exemplary embodiment, within the controller 100, each RAID rank 302 has an associated indicator referred to as the wear level control indicator 304, and each solid state disk 306 has an associated indicator referred to as the SSD life left indicator 308. For example, each of the RAID ranks 104a . . . 104m of FIG. 1 has a corresponding wear level control indicator 304, and each of the solid state disks 102a . . . 102n has a corresponding SSD life left indicator 308.

The SSD wear level control indicator 304 is an indicator (also referred to as a first indicator) that provides a measure of the amount of data and parity information to be written in stripes to the solid state disks included in a RAID rank. For example, in certain embodiments if an exemplary RAID rank 104a has the SSD wear level control indicator set to the value of 32, then 32 stripes of data and parity information may be written to the RAID rank 104a before stripes of additional data and parity information are written to another RAID rank, such as RAID rank 104b.

In certain embodiments, the SSD life left indicator 308 (also referred to as a second indicator) for an exemplary solid state disk provides a measure of the amount of life left for the exemplary solid state disk. In certain other embodiments, the SSD life left indicator 308 may provide a measure of the amount of wear undergone by the exemplary solid state disk. In certain embodiments, if all solid state disks are of the same type and are all new then results obtained by configuring the SSD life left indicator to provide a measure the amount of life left in the exemplary solid state disk or configuring the SSD life left indicator to measure the amount of wear undergone by the exemplary solid state disk may both be acceptable. In alternative embodiments, if not all solid state disks are of the same type or if some of the solid state disks have been used previously, then the SSD life left indicator 308 may be configured to measure the amount of life left for the exemplary solid state disk.

The wear leveling application 112 may call some other application to determine the value of SSD life left indicator 308 for any of the solid state disks 102a ... 102n. Calculation of the values for the SSD life left indicator 308 may take into account any of the methods and procedures that solid state disks use to deal with solid state disk endurance. It is possible to have different technologies or different vendors drives in the same RAID rank.

Figure 4:
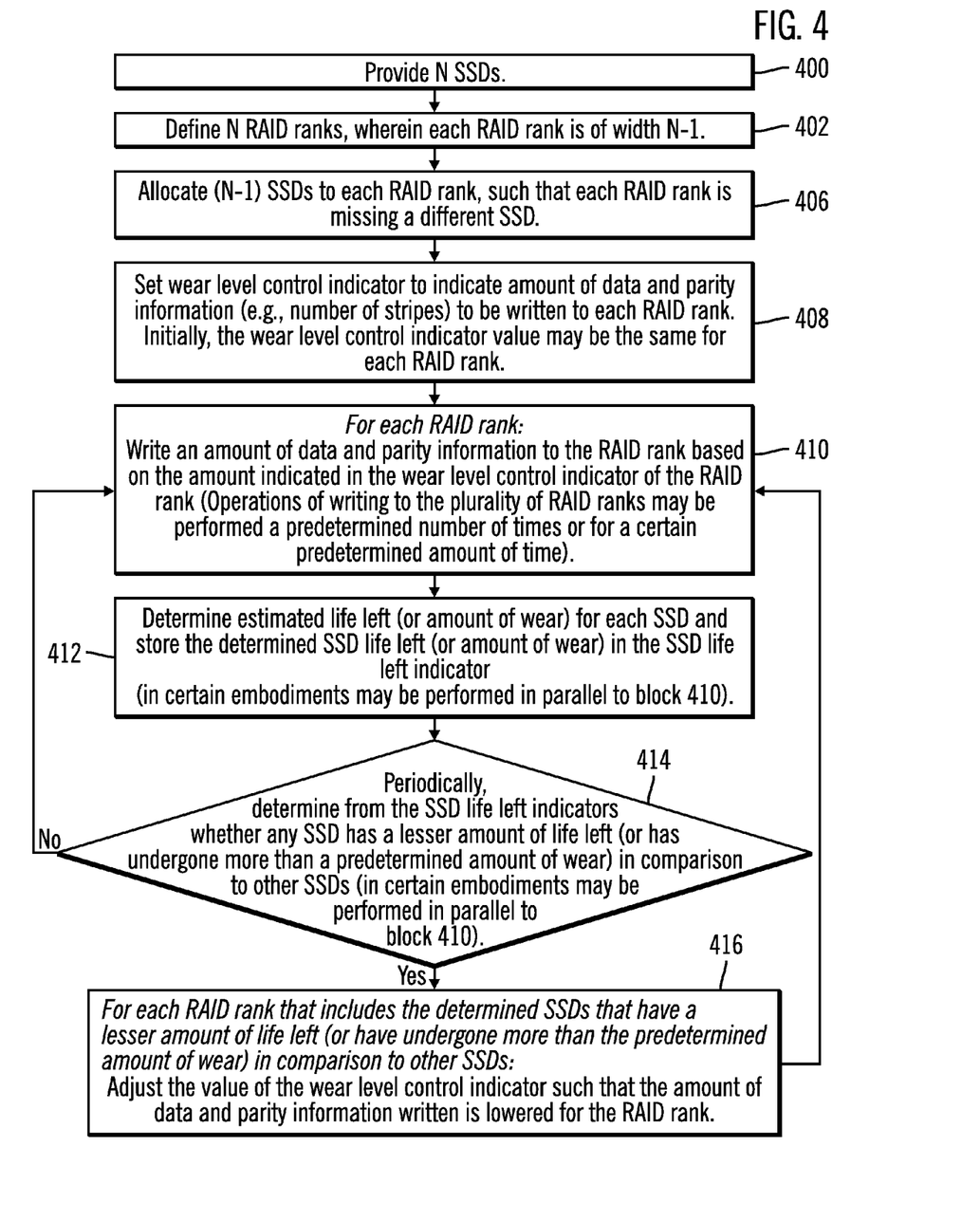
FIG. 4 illustrates a first flowchart that shows first operations implemented in the controller, in accordance with certain embodiments.

FIG. 4 illustrates a first flowchart that shows first operations implemented in the controller 100, in accordance with certain embodiments.

Control starts at block 400 in which N solid state disks 102a ... 102n are provided. The wear leveling application 112 that executes in the controller 100 defines (at block 402) N RAID ranks, wherein each RAID rank is of width N−1. For example, in the exemplary embodiment shown in FIG. 2, if there are six solid state disks SSD1, SSD2, SSD3, SSD4, SSD5, SSD6 then six RAID ranks, each of width five, are defined.

At block 406, the wear leveling application 112 allocates (N−1) solid state disks to each RAID rank, such that each RAID rank is missing a different solid state disk. For example, in the exemplary RAID ranks 202, 204, 206, 208, 210, 212 shown in FIG. 2 each RAID rank is missing a different solid state disk.

The wear leveling application 112 sets (at block 408) the wear level control indicator 304 for each RAID rank to indicate the amount of data and parity information (e.g., number of stripes) to be written to each RAID rank. Initially the wear level control indicator value may be the same for each RAID rank.

Control proceeds to block 410, in which the wear level application 112 ensures that for each RAID rank, the amount of data and parity information that is written to the RAID rank is based on the amount indicated in the wear level control indicator 304 of the RAID rank. For example, in an exemplary embodiment, each of the RAID ranks 202, 204, 206, 208, 210, 212 are written with the amount of data and parity information indicated by individual wear level control indicators corresponding to the RAID ranks 202, 204, 206, 208, 210. 212. In certain embodiments, the operations of writing to the plurality of RAID ranks may be performed a predetermined number of times or for a certain predetermined amount of time. For example, data and parity information may be written to each of RAID ranks 202, 204, 206, 208, 210, 212 for ten iterations before control proceeds to block 412.

After data and parity information has been written to each of the RAID ranks, the wear level application 112 determines (at block 412) the estimated life left (or in alternative embodiments, the amount of wear) for each solid state disk of the N solid state disks and stores the estimated life left (or alternatively, the amount of wear) in the SSD life left indicator 308.

Control proceeds to block 414 in which the wear level application 112 determines from the N SSD life left indicators corresponding to the N solid state disks whether any solid state disk has a lesser amount of life left (or in alternative embodiments, has undergone more than a predetermined amount of wear) in comparison to other solid state disks. For example, in an exemplary embodiment the wear level application 112 may determine that out of all the solid state disks in FIG. 2, solid state disk SSD3 has significantly less life left than the other solid state disks SSD1, SSD2, SSD4, SSD5, SSD6.

In certain embodiments, the operations in blocks 412, 414 may be performed after every iteration of the writing of data and parity information to the plurality of RAID ranks. In alternative embodiments the operations in block 412, 414 may be performed after a suitable number of iterations of the writing of data and parity information to the plurality of RAID ranks, or periodically after a predetermined amount of time. In certain embodiments, the operations in block 412, 414 may be performed in parallel with the writing of data and parity information to the RAID ranks. For example, a process may be spawned by the wear leveling application 112 at suitable intervals, wherein the spawned process may determine the estimated life left (or amount of wear) for each SSD and store the determined life left (or amount of wear) in the SSD life left indicator, and then determine from the SSD life left indicators whether any SSD has a lesser amount of life left (or has undergone more than a predetermined amount of wear) in comparison to other SSDs. The operations performed by the spawned process may be performed in parallel with other operations being performed by the wear leveling application 112.

If the wear level application 112 determines that a selected solid state disk has a lesser amount of life left (or alternatively, in certain embodiments has undergone more than a predetermined amount of wear) in comparison to other solid state disks then, for each RAID rank that includes the determined selected solid state disk, the wear level application 112 adjusts (at block 416) the value of the wear level control indicator 304, such that the amount of data and parity information written is lowered for the RAID rank. For example, in FIG. 2, if solid state disk SSD3 has undergone more than the predetermined amount of wear in comparison to other solid state disks then the value of the wear level control indicators corresponding to RAID ranks indicated by reference numerals 202, 204, 206, 210, 212 are lowered, i.e., in the next iteration of writing of data and parity information fewer writes will be performed on each of the RAID ranks indicated by reference numerals 202, 204, 206, 210, 212 in comparison to the RAID rank indicated by reference numeral 208, wherein the RAID rank indicated by reference numeral 208 does not include the solid state disk SSD3. From block 416 control returns to block 410 for writing the next iteration of data and parity information based on the amount indicated in the wear level control indicator of each RAID rank.

If at block 414, the wear level application 112 determines that no solid state disk has a lesser amount of life left (or has undergone more than a predetermined amount of wear) in comparison to other solid state disks then no adjustments have to be made to the wear level control indicators of the RAID ranks and control returns to block 408 for writing the next round of data and parity information.

In an exemplary embodiment similar to embodiments illustrated in FIG. 4, it may turn out that setting the wear level control indicators 304 to a value of 32 for each RAID rank provides enough granularity to deal with various wearout situations. In certain embodiments, it may be assumed that all the solid state disks in the RAID ranks are new and each wear level control indicator 304 value is set to 32. For example, in the case of six RAID ranks 202, 204, 206, 208, 210, 212 (shown in FIG. 2) with the wear level control indicators set at 32, exemplary solid state disks SSD1, SSD2, SSD3, SSD4, SSD5 may return SSD life left indicator values of 95 (meaning about 95% of life is left) and solid state disk SSD6 may return a SSD life left indicator value of 93. The RAID controller 100 may then adjust the wear leveling control indicator value to be 35 for the RAID rank 202 that excludes the solid state disk SSD6 and leave wear leveling control indicator values for the other solid state disks 204, 206, 208, 210, 212 at 32. Alternately, the RAID controller 100 may leave the wear leveling control indicator value to be 32 for the RAID rank 202 that excludes the solid state disk SSD6 and adjust the wear leveling control indicator values for the other RAID ranks 204, 206, 208, 210, 212 to be 30. Many other variations are possible.

Figure 5:
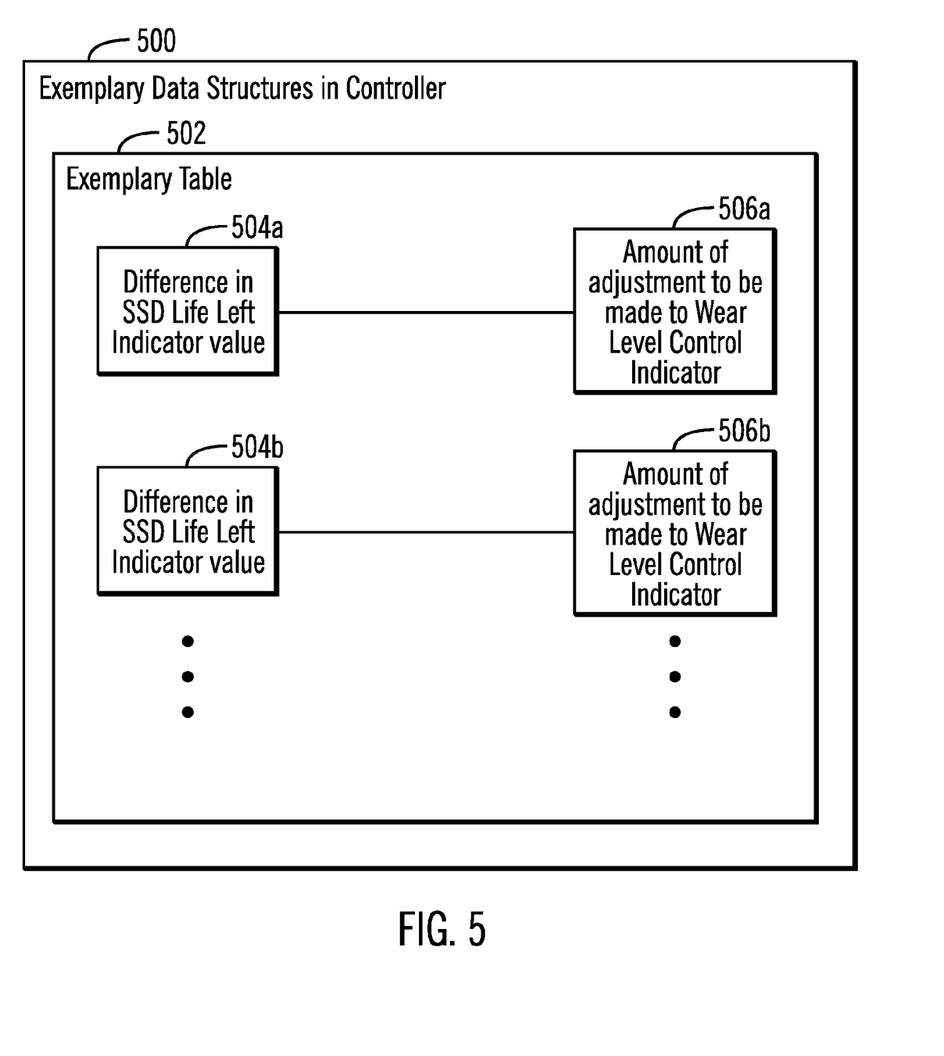
FIG. 5 illustrates a block diagram that shows second exemplary data structures in the controller, in accordance with certain embodiments.

FIG. 5 illustrates a block diagram that shows second exemplary data structures 500 in the controller 100, in accordance with certain embodiments. An exemplary table 502 (or some other alternative data structure or code) may be maintained in the controller 100, wherein the exemplary table 502 may for each difference in SSD life left indicator 308 values provide the amount of adjustment to be made to the wear level control indicator 304 for the RAID ranks. For example, for difference in SSD life left indicator value 504a the amount of adjustment to be made to the wear level control indicator 304 is shown by reference numeral 506a, and for difference in SSD life left indicator value 504b the amount of adjustment to be made to the wear level control indicator 304 is shown by reference numeral 506b. While performing the operations shown in block 414 of FIG. 4, the wear level application 112 may use the exemplary table 502 to determine the amount of adjustment to be made to the wear level control indicators of RAID ranks. In an exemplary embodiment, if the difference in SSD life left indicator value is relatively high (e.g., an exemplary solid state disk has a much lesser amount of life left than other solid state disks) then the amount of adjustment to be made to the wear level control indicators may also be relatively high.

Figure 6:
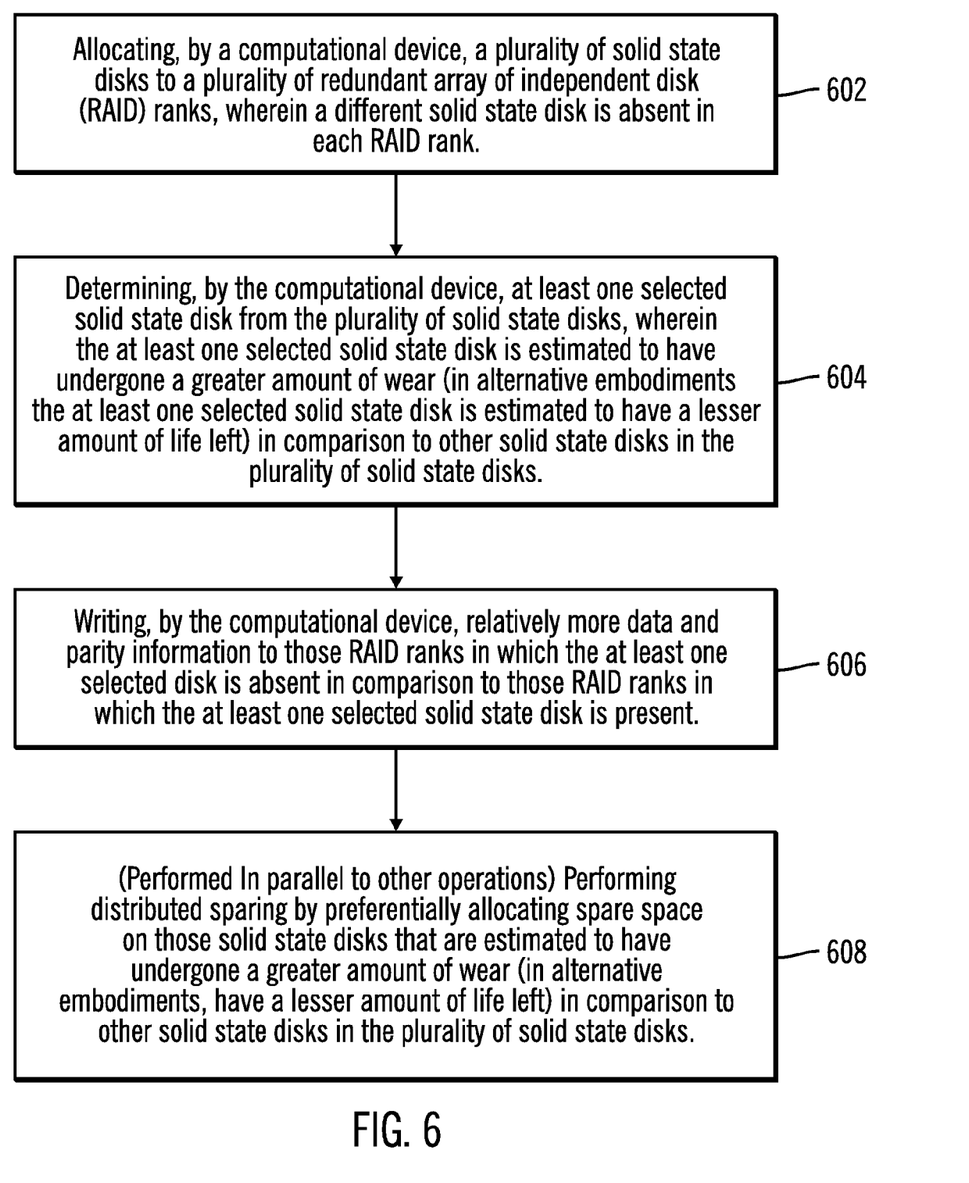
FIG. 6 illustrates a second flowchart that shows second operations implemented in the controller, in accordance with certain embodiments.

FIG. 6 illustrates a second flowchart that shows second operations implemented in the controller 100, in accordance with certain embodiments.

Control starts at block 602, in which a wear leveling application 112 executing in a computational device 100 (such as a controller) allocates (at block 602) a plurality of solid state disks 102a . . . 102n to a plurality of redundant array of independent disk (RAID) ranks 104a . . . 104m, wherein a different solid state disk is absent in each RAID rank of the plurality of RAID ranks 104a . . . 104m.

Control proceeds to block 604 in which the wear leveling application 112 executing in the computational device 100 determines at least one selected solid state disk from the plurality of solid state disks 102a . . . 102n, wherein the at least one selected solid state disk is estimated to have undergone a greater amount of wear in comparison to other solid state disks in the plurality of solid state disks 102a . . . 102n. In alternative embodiments, in block 604, the wear leveling application 112 executing in the computational device 100 determines at least one selected solid state disk from the plurality of solid state disks 102a . . . 102n, wherein the at least one selected solid state disk is estimated to have a lesser amount of life left in comparison to other solid state disks in the plurality of solid state disks 102a . . . 102n.

The wear leveling application 112 controls the RAID ranks 104a . . . 104m, such that relatively more data and parity information is written (at block 606) to those RAID ranks in which the at least one selected solid state disk is absent in comparison to those RAID ranks in which the at least one selected disk is present.

In further embodiments, the at least one selected solid state disk is a first solid state disk. The computational device 100 determines a second solid state disk from the plurality of solid state disks 102a . . . 102n, wherein the second solid state disk is estimated to have a lesser amount of life left in comparison to other solid state disks in the plurality of solid state disks 102a . . . 102n. Relatively more data and parity information is written to those RAID ranks in which the second selected solid state disk is absent in comparison to those RAID ranks in which the second solid state disk is present.

In certain embodiments, distributed sparing is performed (block 608) in parallel to other operations by preferentially allocating spare space on those solid state disks that are estimated to have undergone a greater amount of wear in comparison to other solid state disks in the plurality of solid state disks. There is no dedicated spare drive, but spare space is allocated on all the drives. The spare space is allocated to those solid state disks that are relatively more likely to fail in comparison to other solid state disks. As a result, the likelihood of a failure of a solid state disk that is storing data and parity information is reduced. In alternative embodiments, dedicated sparing may be performed. In alternative embodiments, in block 608, spare space is allocated preferentially on those solid state disks that are estimated to have a lesser amount of life left in comparison to other solid state disks in the plurality of solid state disks.

Figure 7:
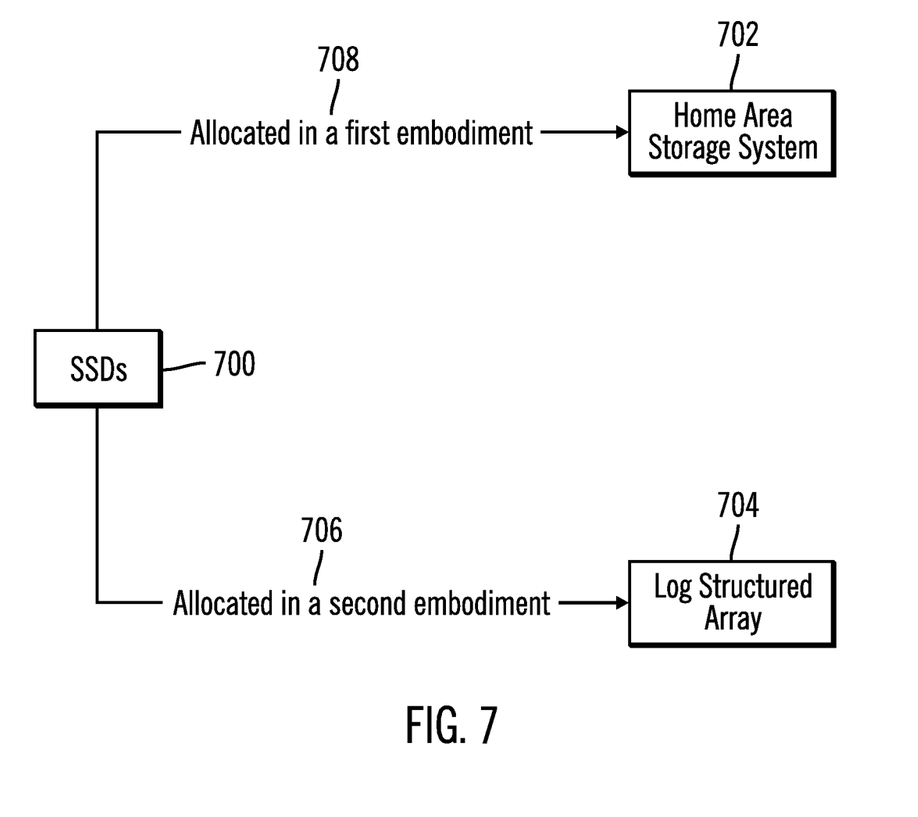
FIG. 7 illustrates a block diagram that shows the allocation of solid state disks in home area storage systems and as a log structured array, in accordance with certain embodiments.

FIG. 7 illustrates a block diagram that shows the allocation of solid state disks 700 in home area storage systems 702 and as a log structured array (LSA) 704, in accordance with certain embodiments.

In certain embodiments (reference numeral 706), in response to the plurality of solid state disks 700 being allocated in a log structured array 704, metadata is added to an index of the log structured array 704, wherein in log structured arrays each write is performed without any overwriting of previously performed writes. Furthermore, in certain embodiments (reference numeral 708) in response to the plurality of solid state disks 700 being allocated as home area storage systems 702, RAID ranks are rotated based on stripe number. Although embodiments may be implemented with LSA or home area types of arrays, embodiments may be preferred in conjunction with LSA where each write is performed fresh and overwriting is never performed.

In certain embodiments in which a solid state disk is replaced with a brand new drive, the RAID controller 100 may set the wear leveling control indicator 304 to zero for the RAID rank which leaves out the brand new drive. Therefore, depending on other values, the new solid state disk will be used relatively more often and will wear relatively more in comparison to other solid state disks.

In certain embodiments, RAID ranks may be defined in other ways. For example, in certain embodiments, the number of RAID ranks may be more than the number of solid state disks. In certain alternative embodiments, RAID ranks that leave out two or more solid state disks at a time may be defined. Variations of the embodiments may be applied for wear leveling of solid state disks in such situations.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
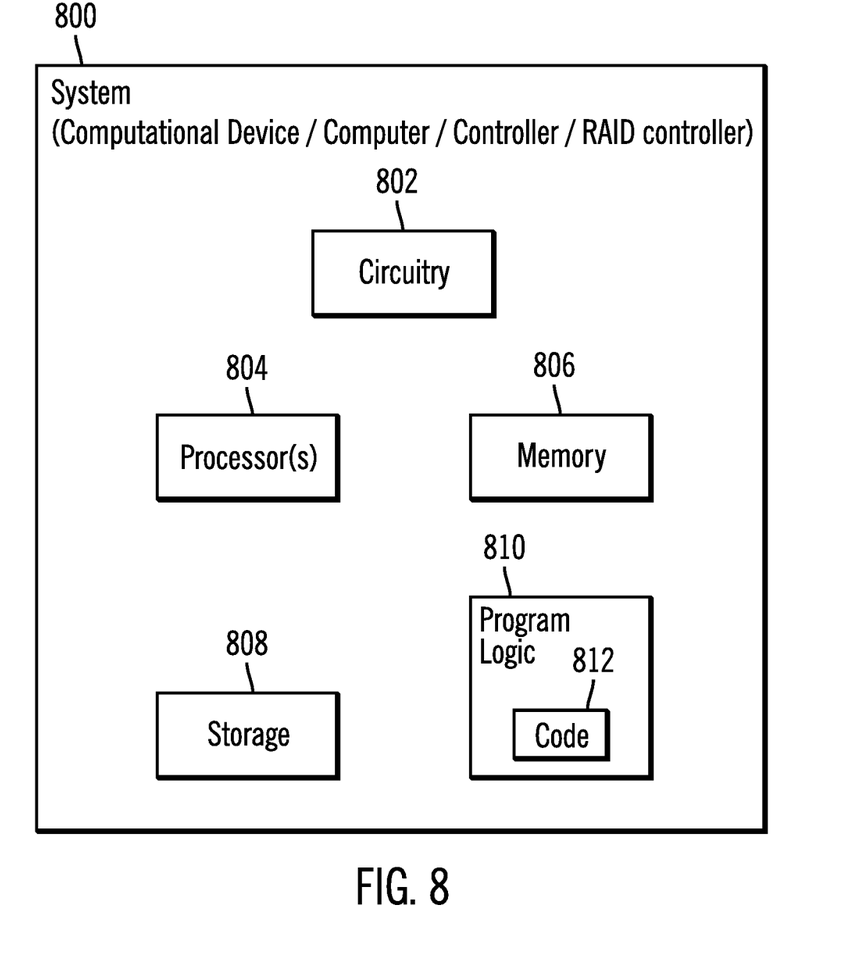
FIG. 8 illustrates a block diagram of a computational system that shows certain elements that may be included in the controller of FIG. 1, in accordance with certain embodiments.

FIG. 8 illustrates a block diagram that shows certain elements that may be included in the system 800 in accordance with certain embodiments. The system 800 may comprise the computational device 100 (e.g., a RAID controller), and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    allocating, by a computational device, a plurality of solid state disks to a plurality of redundant array of independent disk (RAID) ranks, wherein a different solid state disk is absent in each RAID rank of the plurality of RAID ranks, and wherein the plurality of RAID ranks are fewer in number than the plurality of solid state disks;
    maintaining a first indicator corresponding to each RAID rank, wherein the first indicator indicates the amount of data and parity to be written to a corresponding RAID rank, and maintaining a second indicator corresponding to each solid state disk, wherein the second indicator indicates an amount of wear undergone by a corresponding solid state disk;
    determining a first solid state disk from the plurality of solid state disks, wherein the first solid state disk is estimated to have undergone a greater amount of wear in comparison to other solid state disks in the plurality of solid state disks;
    determining a second solid state disk from the plurality of solid state disks, wherein the second solid state disk is estimated to have a lesser amount of life left in comparison to other solid state disks in the plurality of solid state disks; and
    writing relatively more data and parity information to those RAID ranks in which the second selected solid state disk is absent in comparison to those RAID ranks in which the second solid state disk is present.

2. The method of claim 1, wherein:
    the allocated solid state disks in each RAID rank are fewer in number than the plurality of solid state disks; and
    each solid state disk of the plurality of solid state disks is shared by more than one RAID rank.

3. The method of claim 2, further comprising:
    performing distributed sparing by preferentially allocating spare space on those solid state disks that are estimated to have undergone a greater amount of wear in comparison to other solid state disks in the plurality of solid state disks.

4. The method of claim 3, wherein:
    in response to the plurality of solid state disks being allocated in a log structured array, adding metadata to an index of the log structured array, wherein in log structured arrays each write is performed without any overwriting of previously performed writes; and
    in response to the plurality of solid state disks being allocated as home area storage systems, rotating RAID ranks based on stripe number.

5. The method of claim 3,
    wherein if the first indicator for a first RAID rank indicates a first number, then a first number of stripes of data and parity information are written to the first RAID rank before stripes of additional data and parity information are written to another RAID rank, and wherein the method further comprises:
    maintaining a data structure that indicates an adjustment to be made to a value stored in the first indicator based on differences in second indicator values of the plurality of solid state disks.

6. The method of claim 1, wherein the computational device is a RAID controller, and wherein the plurality of solid state disks are operatively coupled to the RAID controller.

7. A controller for configuring a plurality of solid state disks, the controller comprising:
    a memory; and
    a processor coupled to the memory, wherein the processor performs operations, the operations comprising:
    allocating the plurality of solid state disks to a plurality of redundant array of independent disk (RAID) ranks, wherein a different solid state disk is absent in each RAID rank of the plurality of RAID ranks, and wherein the plurality of RAID ranks are fewer in number than the plurality of solid state disks;
    maintaining a first indicator corresponding to each RAID rank, wherein the first indicator indicates the amount of data and parity to be written to a corresponding RAID rank, and maintaining a second indicator corresponding to each solid state disk, wherein the second indicator indicates an amount of wear undergone by a corresponding solid state disk;

determining a first solid state disk from the plurality of solid state disks, wherein the first solid state disk is estimated to have undergone a greater amount of wear in comparison to other solid state disks in the plurality of solid state disks; and determining, a second solid state disk from the plurality of solid state disks, wherein the second solid state disk is estimated to have a lesser amount of life left in comparison to other solid state disks in the plurality of solid state disks; and writing relatively more data and parity information to those RAID ranks in which the second selected solid state disk is absent in comparison to those RAID ranks in which the second solid state disk is present.

8. The controller of claim 7, wherein:

the allocated solid state disks in each RAID rank are fewer in number than the plurality of solid state disks; and each solid state disk of the plurality of solid state disks is shared by more than one RAID rank.

9. The controller of claim 8, the operations further comprising:

performing distributed sparing by preferentially allocating spare space on those solid state disks that are estimated to have undergone a greater amount of wear in comparison to other solid state disks in the plurality of solid state disks.

10. The controller of claim 9, wherein:

in response to the plurality of solid state disks being allocated in a log structured array, adding metadata to an index of the log structured array, wherein in log structured arrays each write is performed without any overwriting of previously performed writes; and in response to the plurality of solid state disks being allocated as home area storage systems, rotating RAID ranks based on stripe number.

11. The controller of claim 9, wherein if the first indicator for a first RAID rank indicates a first number, then a first number of stripes of data and parity information are written to the first RAID rank before stripes of additional data and parity information are written to another RAID rank, and wherein the operations further comprise:

maintaining a data structure that indicates an adjustment to be made to a value stored in the first indicator based on differences in second indicator values of the plurality of solid state disks.

12. The controller of claim 7, wherein the controller is a RAID controller, and wherein the plurality of solid state disks are operatively coupled to the RAID controller.

13. A computer program product for wear leveling of a plurality of solid state disks, the computer program product comprising:

a non-transitory computer readable storage medium having computer readable program code embodied therewith, the computer readable program code configured to:

allocate the plurality of solid state disks to a plurality of redundant array of independent disk (RAID) ranks, wherein a different solid state disk is absent in each RAID rank of the plurality of RAID ranks, and wherein the plurality of RAID ranks are fewer in number than the plurality of solid state disks;

maintain a first indicator corresponding to each RAID rank, wherein the first indicator indicates the amount of data and parity to be written to a corresponding RAID rank, and maintaining a second indicator corresponding to each solid state disk, wherein the second indicator indicates an amount of wear undergone by a corresponding solid state disk;

determine a first solid state disk from the plurality of solid state disks, wherein the first solid state disk is estimated to have undergone a greater amount of wear in comparison to other solid state disks in the plurality of solid state disks; and determine, a second solid state disk from the plurality of solid state disks, wherein the second solid state disk is estimated to have a lesser amount of life left in comparison to other solid state disks in the plurality of solid state disks; and write relatively more data and parity information to those RAID ranks in which the second selected solid state disk is absent in comparison to those RAID ranks in which the second solid state disk is present.

14. The computer program product of claim 13, wherein:

the allocated solid state disks in each RAID rank are fewer in number than the plurality of solid state disks; and each solid state disk of the plurality of solid state disks is shared by more than one RAID rank.

15. The computer program product of claim 14, wherein the computer readable program code is further configured to:

perform distributed sparing by preferentially allocating spare space on those solid state disks that are estimated to have undergone a greater amount of wear in comparison to other solid state disks in the plurality of solid state disks.

16. The computer program product of claim 15, wherein:

in response to the plurality of solid state disks being allocated in a log structured array, adding metadata to an index of the log structured array, wherein in log structured arrays each write is performed without any overwriting of previously performed writes; and in response to the plurality of solid state disks being allocated as home area storage systems, rotating RAID ranks based on stripe number.

17. The computer program product of claim 15, wherein if the first indicator for a first RAID rank indicates a first number, then a first number of stripes of data and parity information are written to the first RAID rank before stripes of additional data and parity information are written to another RAID rank, and wherein the computer readable program code is further configured to:

maintain a data structure that indicates an adjustment to be made to a value stored in the first indicator based on differences in second indicator values of the plurality of solid state disks.

* * * * *